United States Patent [19]

Sharpe, Jr.

[11] Patent Number: 4,990,263

[45] Date of Patent: Feb. 5, 1991

[54] MELAMINE-FORMALDEHYDE RESINS IN THE FLOCCULATION OF HIGH SOLIDS MINERAL SLURRIES

[76] Inventor: Andrew J. Sharpe, Jr., Star Rte. 1, Box 130, Comfort, W. Va. 25049

[21] Appl. No.: 310,247

[22] Filed: Feb. 13, 1989

[51] Int. Cl.$^5$ ................................................. C02F 1/56
[52] U.S. Cl. .................................... 210/710; 106/465; 106/487; 209/5; 210/728; 210/734; 210/735; 210/778; 501/148; 524/447
[58] Field of Search ............ 106/288 B, 208 B; 209/5; 210/710, 725, 727, 728, 733, 734, 735, 778; 501/148

[56] References Cited

U.S. PATENT DOCUMENTS

| | | | |
|---|---|---|---|
| 3,285,849 | 11/1966 | Watanabe et al. | 210/735 |
| 3,290,310 | 12/1966 | Morf | 210/735 |
| 3,408,293 | 10/1968 | Dajani et al. | 209/5 |
| 3,484,837 | 12/1969 | Odom et al. | 210/906 |
| 3,753,902 | 8/1973 | Stettler | 210/735 |
| 4,174,279 | 11/1979 | Clark et al. | 501/149 |
| 4,271,028 | 6/1981 | Marfurt et al. | 210/727 |
| 4,481,116 | 11/1984 | Cabestany et al. | 210/735 |
| 4,647,382 | 3/1987 | Sharpe | 210/734 |

*Primary Examiner*—Peter Hruskoci

[57] ABSTRACT

Finely divided aqueous mineral slurries such as kaolin clay and calcium carbonate are dewatered, filtered and prepared for shipment by and with the addition of an effective amount (preferably 0.01 to 4.0 pounds per ton of solids) of melamine/formaldehyde polymer.

7 Claims, No Drawings

MELAMINE-FORMALDEHYDE RESINS IN THE FLOCCULATION OF HIGH SOLIDS MINERAL SLURRIES

TECHNICAL FIELD

This invention relates to processes for flocculating and thickening and/or dewatering finely divided aqueous mineral slurries containing 10% or more by weight of solids, such as kaolin clays, calcium carbonate, calcium sulfate and other finely divided minerals, to filter or otherwise dewater them prior to shipment of the minerals.

BACKGROUND OF THE INVENTION

Flocculants are reagents which are added to suspensions of solids to cause the solids to agglomerate (or flocculate) into larger particle sizes which settle and/or dewater more efficiently than in their original state. Polymeric water soluble flocculants may be nonionic, anionic, cationic or amphoteric. The particular type of flocculant to choose in a given application may depend upon the nature of the surface of the suspended solids, the pH of the aqueous slurry, and the desirable or undesirable side effects.

Approximately 5 to 6 million tons of kaolinitic clay are mined, processed and shipped from the southeastern United States per year. The clay is usually mined by the open pit method. It is then slurried in water at about 20-30% solids, dispersed with various combinations of inorganic and organic dispersants to maintain a low viscosity, and processed. Processing includes removal of iron and other magnetic impurities, removal of sand and silt, bleaching for whiteness and brightness, and, finally, dewatering. Dewatering is commonly accomplished by rotary vacuum filters although other methods of dewatering such as pre-thickening, centrifugation, and filtration on pressure filters are feasible. The filter cake obtained from the rotary vacuum filters is, in the present state of the art, usually about 50% to about 60% solids.

Also in the present state of the art, a portion of the filter cake is typically spray dried and blended back with the remaining filter cake to obtain an aqueous slurry containing 70% solids or more. Additional dispersants may be added to the 70% solids slurry with mixing as needed to obtain a final Brookfield viscosity of less than 1000 cps, and preferably less than 500 cps. This low viscosity, 70% solids slurry is then shipped in bulk to the customer.

My U.S. Pat. Nos. 4,647,382 and 4,741,838 disclose the use of certain anionic polymers of 2-acrylamido-2-methyl propane sulfonic acid AMPS® or their water soluble salts as flocculants which improve the dewatering of mineral slurries and which also enable the ready redispersal of the filter cake to a low viscosity, high solids slurry. My copending application filed simultaneously herewith entitled "Preparation of High Solids Mineral Slurries" discloses the use of certain polymers of dicyandiamide and formaldehyde and certain derivatives thereof as flocculants to improve the dewatering of mineral slurries and, quite surprisingly, also to enable the ready redispersal of the filter cake to a low viscosity, high solids slurry.

® Registered Trademark of Lubrizol Corp., Cleveland, Ohio

Certain organic cationic polymers are known to be effective flocculants and, in fact, are widely used as such in water, waste water and process water treatment. Typical of these products are aminomethylated polyacrylamides (AMPAM's) such as those described in U.S. Pat. No. 3,323,979, polyquaternary amines (PQA's) such as those described in U.S. Pat. Nos. Re. 28,807 and 28,808, and polydiallyldimethyl ammonium chlorides (DADMAC's or DMDAAC's) prepared according to U.S. Pat. No. 3,288,770.

Logically these same organic cationic polymers should effectively flocculate mineral slurries such as kaolinitic clays and, in fact, they are effective flocculants and are widely known to be effective for these applications. In particular, products of this type are commonly used in the clay industry in the clarification of magnet wash water wherein the solids are disposed of and are not returned to a process stream. However, these products have not been employed in treatment of any mineral slurry wherein the solids remain in the main-line process and wherein the mineral solids must subsequently be redispersed to a high solids, low viscosity slurry. Once a mineral slurry such as kaolin clay, calcium carbonate or calcium sulfate has been flocculated with one or more of these state-of-the-art cationic flocculants, the floc will not break down. In fact, it has been impossible to satisfactorily redisperse mineral slurries so treated by conventional means. Thus, the possible use of these cationic polymers for the applications described in the present application, specifically the flocculation, concentration and redispersal of high solids mineral slurries, has been precluded by the above noted devastating side effects.

Water soluble and dispersible polymers of melamine formaldehyde are widely used in the paper industry primarily as wet strength agents. For example, melamine/formaldehyde resins prepared from one mole of melamine reacted with up to three moles of formaldehyde are approved by the Food and Drug Administration for use in molded articles used in food packaging. Similar melamine formaldehyde polymers are also approved for use in paper and paperboard products to improve wet strength. They have also shown some limited utility as flocculants for low solids aqueous suspensions, such as surface water clarification. Commercially available products of this type include Chem-Link "Perchem 525" and American Cyanamid's Magnifloc 515. However, prior to the present invention there was (1) no reason to expect these products to function as flocculants in a high solids aqueous suspensions such as the mineral slurries which are the subject of this invention and (2) absolutely no reason to expect that such cationic polymers would not exert a devastating effect on the viscosity of the redispersed slurries after dewatering.

SUMMARY OF THE INVENTION

The present invention employs certain polymeric cationic organic flocculants for thickening and/or dewatering aqueous mineral slurries such as kaolinitic clay, calcium carbonate, and calcium sulfate, containing 10% or more by weight mineral solids and which mineral slurries must subsequently be redispersed to high solids, low viscosity aqueous slurries. Because of my choice of flocculating materials, and in contrast to prior art teachings, the flocculated mineral may be redispersed to a low viscosity slurry after the dewatering process with conventional additives such as inorganic and/or low molecular weight anionic polymeric dispersants with mixing.

The cationic polymers employed in the instant invention provide improved (i.e. less) moisture in the dewatered product while exerting at most an insignificant effect on throughput. Further, contrary to prior experience with organic cationic polymers, use of the cationic flocculants of the instant invention does not preclude subsequent redispersal to a low viscosity slurry. Further, use of these flocculants has only a negligible effect on the viscosity of the final, redispersed product. In fact, as the results reported hereinafter will show, low dosages of the cationic flocculants of the invention can actually reduce the final viscosity of the product slurry compared to that obtained with no flocculant or with the commonly used alum. One skilled in the art will recognize that these results are extremely surprising and unexpected.

A further advantage of using the cationic organic polymers of the instant invention is the ability to reduce or eliminate the use of alum (aluminum sulfate) as a coagulant. The end uses of some grades of minerals require that the content of inorganic matal salts such as alum be minimized. Thus, the use of the polymers of the instant invention allows the production of a more desirable mineral product for certain end uses.

The cationic flocculants I use are polymeric condensation products of melamine and formaldehyde which have been dispersed in an aqueous, acidic (preferably based on hydrochloric acid) medium. When dispersed in aqueous hydrochloric acid at about 7% solids, they exhibit Brookfield viscosities of abour 100 cps or less; usually less than 50 cps, and often less than 20 cps.

The present invention also contemplates the use of the melamine-formaldehyde resins in combination with AMPS® or its water soluble or dispersible salts to further improve dewatering. Such compositions are described in my U.S. Pat. Nos. 4,647,382 and 4,471,838. One skilled in the art will recognize that it is extremely unexpected to discover a cationic polymer which will improve dewatering of mineral slurries without exerting an unacceptable detrimental effect on the final slurry viscosity. It will also be recognized that it is even more unexpected to discover that a particular anionic polymer may be used in combination with the cationic polymer to obtain improved dewatering and which combination does not exert an unacceptable effects on the final product viscosity.
® Registered Trademark of Lubrizol Corp., Cleveland, Ohio

DETAILED DESCRIPTION OF THE INVENTION

The instant invention employs cationic flocculants which effectively enhance the dewatering operations during the processing of mineral slurries, while having only a minimal effect on the final viscosity of the slurry after redispersal, in some situations even providing an improvement. The ability to effect improved dewatering without a significant adverse result in the redispersal step is totally contrary to previous experience with the use of cationic flocculants in mineral slurries. The process of the instant invention provides increased product solids with little or no detrimental effect on throughput or vice versa depending on filter operating conditions. My process has shown surprising utility in dewatering kaolin clay slurries. These same advantages may be realized in processing other kaolinitic clays, calcium carbonate, calcium sulfate and in other operations where finely divided mineral solids must be separated.

The flocculants employed in the instant invention are condensation polymers of melamine and formaldehyde which may be dispersed in aqueous, acidic (preferably hydrochloric) media. Suitable polymers may be prepared according to the procedures described in U.S. Pat. No. 2,559,220 issued July 3, 1951 to C. S. Maxwell and C. G. Landes assigned to American Cyanamid Co., the text of which is specifically incorporated herein by reference. There are, of course, many processes by which suitable melamine formaldehyde products may be made. For example, melamine formaldehyde products intended for use in food grade paper must be made from the reaction of one mole of melamine with not more than 3 moles of formaldehyde (21 CFR 177). Other methods of preparation are contained in British patent No. 894,833. I prefer to use melamine/formaldehyde polymers having a ratio of melamine to formaldehyde of about 1:2 to 3.5. While even a minute amount of the described polymers will have a corresponding beneficial effect, I prefer to use at least about 0.01 lbs. active lbs./ton based on the solids content of the slurry; more than about 4.0 active lbs./ton will generally not achieve correspondingly improved benefits.

Another facet of the present invention is the use of the above described cationic polymers in combination with "AMPS" ® containing anionic polymers and copolymers for improved dewatering of the high solids mineral slurries. The anionic "AMPS" ® containing polymers are water soluble or water dispersible polymers which contain from 1% to 100% by weight, 2-acrylamido-2-methyl propyl sulfonic acid and/or the neutralized salts thereof. Typically the "AMPS" ® containing polymers will be substantially either "AMPS" ® homopolymers and/or "AMPS" ® copolymers with, for example, acrylamide, generally having a Brookfield viscosity of 10,000 cps or more as a 7% active aqueous solution. While up to about 300 ppm of active "AMPS" ® containing polymer may be used with the above described cationics, I prefer to use from about 0.01 to about 4.0 active lbs./ton based on the weights of the solids to be treated.

EXAMPLES

Standard laboratory filter leaf tests were conducted to demonstrate the improved filter operation attainable. As is known in the art, the filter leaf test employs a hollow, more or less conical plastic device which is connected to a vacuum pump or aspirator and which is covered with a piece of filter cloth, preferably the same type of cloth used commercially for the slurry being tested.

The filter leaf is immersed in a container of slurry for a predetermined number of seconds, preferably the approximate time of immersion on the commercial filter, while under vacuum to draw the slurry to the cloth. The filter leaf is then inverted for another predetermined time under vacuum to dry.

The cake obtained on the cloth is then scraped into a tared container and weighed; the cake is then dried overnight in an oven at a standard temperature, e.g. 105° C., and reweighed. The yield of wet filter cake from the lab filter is determined in grams per square inch. This result is converted to pounds per square foot to predict performance on the full scale filter. Cake solids are calculated from the dry weight and wet weight of the collected filter cakes. The cakes from 3 filter leaf evaluations are combined to obtain each result listed below. The results are combined to improve the statistical reliability of the data. This procedure was followed in the experiments described below.

In Table IA, "bowl" weights and "bowl plus clay" weights are expressed in grams. The yield of pounds per square foot per hour was calculated from the lab filter yield which is in terms of grams per square inch taking into account the known revolutions per hour and total square footage of filter area for the full scale commercial filter. Determinations were completed for the control and each polymer dosage. A very fine (very small particle size, e.g. 97% <2 micron) grade of kaolin clay which is extremely difficult to filter was used in these evaluations.

Comparison Example I

A strongly cationic polymer, polydiallyldimethylammonium chloride, was used in the following evaluations. This product is typical of commercially available cationic products. The specific polyDADMAC used in this work was Percham 553, a product of Chemlink, which is 20% active and has a Brookfield viscosity of approximately 100–200 cps. This product was designated AJS-31B. Other conditions for these evaluations are summarized below.

| | |
|---|---|
| feed solids | 28.70 |
| feed temperature | 70.00 |
| feed pH | 3.09 |
| inches vacuum | 25.00 |
| CFM cloth | 3.50 |
| backing | closed knit |
| % submergence | 30.00 |
| filter RPH | 45.00 |

TABLE IA

| Chemical Dosage lbs./ton | Grams Wet Cake | Grams Dry Cake | Yield lb/ft²/hr | Yield ton/hr | Cake Solids (%) |
|---|---|---|---|---|---|
| 1.0 AJS-31B | 107.1 | 63.0 | 19.94 | 15.22 | 58.82 |
| 2.0 AJS-31B | 126.1 | 72.1 | 22.82 | 17.42 | 57.18 |
| 2.0 Alum | 92.4 | 55.8 | 60.39 | 17.66 | 13.48 |
| Control | 68.3 | 42.6 | 62.37 | 13.48 | 10.29 |

(a.) 1. All slurry samples were pretreated with 4.5 lbs/ton sulfuric acid.
2. Slurry samples treated with AJS-31B were not treated with alum.
3. Control was not treated with alum or AJS-31B.

The filter cake from the four experiments in Table IA was redispersed in the laboratory to simulate preparation for shipment. The weighed, dried filter cake from each experiment was added to sufficient water and dispersant to obtain approximately 70% clay solids. The level of dispersant ("60–40", a mixture of 60% soda ash and 40% of a 43% solution of low molecular weight polyacrylic acid) is noted in Table IB. The mixture was then placed on a Hobart lab mixer and mixed for 10 minutes. The Brookfield and Hercules viscosity of the redispersed slurry was then measured and recorded, Brookfield viscosity was measured using Spindla 1 RV and 20 rpm; Hercules viscosity was measured using the A Bob.

TABLE IB

| Flocculant lbs/ton | Dispersant lbs/ton | % soids | Brookfield viscosity | Hercules dynes/rpm |
|---|---|---|---|---|
| 1.0 | 4.5 | 70.0 | 5800 cps | 18.0/610 |

TABLE IB-continued

| Flocculant lbs/ton | Dispersant lbs/ton | % soids | Brookfield viscosity | Hercules dynes/rpm |
|---|---|---|---|---|
| AJS-31B 2.0 | 4.5 | 70.1 | too high off-scale | 18.0/292 |
| AJS-31B 2.0 Alum | 4.5 | 69.9 | 200 cps | 11.8/1100 |
| Control | 4.5 | 70.5 | 222 cps | 7.1/1100 |

The results presented in Table IA clearly show that conventional, commercially available cationic polymers (flocculants) will, as expected, provide improved filterability for a mineral slurry, specifically in this case, a kaolin clay slurry. However, the data in Table IB dramatically illustrate why the commonly available cationic polymers are not used to improve filterability of high solids mineral slurries which must be redispersed to a low viscosity for spray drying or for subsequent sale as very high solids slurries. A general rule of thumb used in the kaolin clay industry is that if the redispersal viscosity at 70% solids exceeds 350 cps Brookfield or 14.0 dynes Hercules at 1100 rpm there is cause for concern. Obviously both viscosities obtained with poly DMDAAC are totally unacceptable.

Example II

A cationic polymer typical of those described herein a low molecular weight condensation polymer derived from the reaction of one mole of melamine with about 3 moles of formaldehyde was used in the following evaluations. The basic polymer described above had been dispersed in hydrochloric acid and water to form an acid colloid of approximately 6% solids. The sample was designated AJS-32A. Other conditions for these evaluations are summarized below.

| | |
|---|---|
| Feed Solids | 28.40 |
| Feed Temperature | 75.00 |
| Feed pH | 3.50 |
| Inches Vacuum | 25.00 |
| CFM cloth | 3.5–4.5 |
| Backing | Closed knit |
| % Submergence | 30.00 |
| Filter RPH | 45.00 |

TABLE IIA

| Chemical[a] Dosage lbs/ton | Wet Clay Wt (g) | Dry Clay WT (g) | Yield lb/ft²/hr | Yield tph | Cake Solids |
|---|---|---|---|---|---|
| 1.50 AJS-32A | 76.8 | 47.0 | 14.87 | 11.36 | 61.20 |
| 1.75 AJS-32A | 77.2 | 47.5 | 15.03 | 11.48 | 61.53 |
| 2.00 AJS-32A | 74.5 | 46.1 | 14.59 | 11.14 | 61.88 |
| 2.00 Alum | 90.1 | 54.0 | 17.09 | 13.05 | 59.93 |
| None | 78.3 | 47.8 | 15.13 | 11.55 | 61.05 |

[a]All slurry samples were pretreated with 4.5 lb/ton sulfuric acid; slurry samples treated with AJS-32A were not treated with alum.

The above Table IIA results indicate that cake solids can be improved by the use of AJS-32A, a melamine formaldehyde acid colloid, by almost two percentage points as compared to alum and almost one percentage point compared to the control where no coagulant or flocculant was used. It is also noteworthy that AJS-32A is only about 6% solids compared to the 50 % solids of commercial liquid alum. While the throughput in the above results was somewhat less than obtained with alum it is approximately the same as the control. Thus for a plant which has adequate dewatering capacity, the use of AJS-32A rather than alum offers the significant advantage of reduced cake moisture with no significant effect on throughput.

The filter cake from the experiments reported in Table IIA were redispersed in the laboratory to stimulate preparation for shipment. The weighed, dried filter cake from each experiment was added to sufficient water and dispersant to obtain a slurry of approximately 70% clay solids. The level of "60-40", the dispersant, which is a mixture of 60% soda ash and 40% of a 43% solids solution of low molecular weight polyacrylic acid, sodium salt, is noted in Table IIB. The mixture was then placed on a Hobart lab mixer and mixed for 10 minutes. The Brookfield viscosity was measured using Spindle 1 RV and 20 rpm; Hercules viscosity was measured using the A bob.

TABLE IIB

| Chemical Dosage lbs/ton | Dispersant 60/40 lbs/ton | % Solids | Brookfield Viscosity cps | Hercules Viscosity Dynes/rpm |
|---|---|---|---|---|
| 1.50 AJS-32A | 4.5 | 70.4 | 289.0 | 9.5/1100 |
| 1.75 AJS-32A | 4.5 | 70.4 | 302.5 | 10.3/1100 |
| 2.00 AJS-32A | 4.5 | 70.8 | 361.0 | 13.4/1100 |
| 2.00 Alum | 4.5 | 70.6 | 306.3 | 16.1/1100 |
| None | 4.5 | 70.6 | 318.8 | 13.4/1100 |

The results reported in Table IIB show unequivocally that the use of the cationic flocculants of the instant invention do not preclude redispersal of the filter cake to obtain a high solids, i.e., 70% slurry which exhibits low viscosity. In fact, it is quite clear that the lower dosages of cationic malamine/formaldehyde copolymers actually improve the redispersal viscosities significantly.

In contrast, the prior art would predict that a cationic flocculant used in the dewatering operation would prevent redispersal of the dewatered solids to a high solids, low viscosity slurry as may be concluded from Example I. On the contrary, the cationic flocculants of the instant invention not only allow effective redispersal, they actually assist or enhance redispersal in some cases.

Example III

The same sample of melamine/formaldehyde resin, PerChem 525 from ChemLink was used in the following evaluations. As before the sample was designated AJS-32A. For this work, AJS-32A, a cationic polymer, was used in conjunction with an anionic polymer, AJS-38, a copolymer of 65% acrylamide and 35% Na AMPS by weight; the product was an aqueous solution containing about 7.3% solids and having a Brookfield viscosity of 82,000 cps. Other conditions for these evaluations are summarized below:

| Feed Solids | 28.4 |
|---|---|
| Feed Temperature | 22.6° C. |
| Feed pH | 3.34 |
| Inches Vacuum | 25.0 |
| CFM Cloth | 3.5–4.5 |
| Backing | Closed Knit |
| % Submergence | 30.00 |
| Filter RPH | 45.00 |

TABLE IIIA

| Chemical Dosage lbs/ton | Wet Clay wt. (g) | Dry Clay wt. (g) | Yield lbs/ft$^2$/ ton | Yield tph | Cake Solids |
|---|---|---|---|---|---|
| 1.75 AJS-32A 0.30 AJS-38 | 75.0 | 47.6 | 15.06 | 11.50 | 63.47 |
| 1.75 AJS-32A 0.40 AJS-38 | 75.6 | 47.2 | 14.94 | 11.40 | 62.43 |
| 1.75 AJS-32A 0.50 AJS-38 | 76.0 | 47.3 | 14.97 | 11.43 | 62.24 |
| 1.50 AJS-32A 0.30 AJS-38 | 72.5 | 45.5 | 14.40 | 10.99 | 62.76 |
| 1.50 AJS-32A 0.40 AJS-38 | 73.6 | 46.1 | 14.59 | 11.14 | 62.64 |
| 2.00 Alum | 89.5 | 54.5 | 17.25 | 13.17 | 60.89 |
| 2.00 Alum 0.30 AJS-38 | 88.4 | 54.2 | 17.15 | 13.10 | 61.31 |
| None | 76.8 | 47.8 | 15.13 | 11.55 | 62.24 |

(a) Clay was pretreated with 4.5 lbs/ton of sulfuric acid; slurry samples treated with AJS-32A were not treated with alum.

The results presented in Table IIIA clearly show that a significant improvement in cake solids may be obtained by using the cationic melamine/formaldehyde resin in conjunction with the AMPS based anionic polymer.

The filter cakes from the experiments reported in Table IIIA were redispersed in the laboratory according to the procedures noted in Example II. These results are summarized in Table IIIB.

TABLE IIIB

| Chemical Dosage lbs/ton | Dispersant 60/40 lbs/ton | % Solids | Brookfield Viscosity cps | Hercules Viscosity Dynes/RPM |
|---|---|---|---|---|
| 1.75 AJS-32A 0.30 AJS-38 | 4.5 | 70.5 | 344 | 16.1/1100 |
| 1.75 AJS-32A 0.40 AJS-38 | 4.5 | 70.5 | 358 | 14.7/1100 |
| 1.75 AJS-32A 0.50 AJS-38 | 4.5 | 70.5 | 356 | sample lost |
| 1.50 AJS-32A 0.30 AJS-38 | 4.5 | 70.5 | 369 | 16.3/1100 |
| 1.50 AJS-32A5 0.40 AJS-38 | 4.5 | 70.5 | 391 | 15.5/1100 |
| 2.00 Alum | 4.5 | 70.4 | 268 | 18.0/988 |
| 2.00 Alum | 4.5 | 70.5 | 310 | 18.0/915 |
| 0.30 AJS-38 None | 4.5 | 70.5 | 278 | 18.0/1100 |

The results presented in Table IIIB clearly demonstrate that the use of the cationic polymers of the instant invention in conjunction with the anionic (co)polymers of U.S. Pat. Nos. 4,647,382 and 4,741,838 do not exert a significant negative effect on the redispersal viscosity of the dewatered slurries. In fact, the high shear viscosity as measured by the Hercules is noticeably improved.

As noted hereinbefore, prior art would predict that a cationic flocculant used in the dewatering operation would preclude redispersal of the dewatered solids to a high solids, low viscosity slurry. Certainly, even if it had occurred to one skilled in the art to evaluate a cationic polymer together with an anionic polymer for dewatering in these applications, the ability to redisperse would not have been considered a realistic expectation.

I claim:

1. Method of treating an aqueous mineral slurry to obtain improved dewatering and a final solids content of at least 50 percent, said slurry containing initially at least about ten percent finely divided mineral solids, comprising adding thereto at least about 0.01 pound of a polymer comprising the reaction product of one mole of melamine with at least about 1.5 mole of formaldehyde per ton of solids in said slurry, wherein the molecular weight of the polymer is such that a 7% dispersion in hydrochloric acid has a Brookfield viscosity of less than 10 cps, dewatering said slurry, and redispersing at least a portion of said slurry with sufficient water and dispersant to a final solids content of at least 50 percent and a final Brookfield viscosity of less than 1000 cps.

2. Method of claim 1 wherein at least about 0.01 to about 4.0 lbs. of the polymer is added per ton of solids in said slurry.

3. Method of claim 1 wherein the mineral is kaolin clay.

4. Method of claim 1 wherein about 0.01 to about 4.0 pounds of an anionic polymer of 2-acrylamido-2-methyl propane sulfonic acid or a salt thereof is also added to said slurry per ton of solids.

5. Method of processing minerals for shipment comprising (a) forming a slurry of at least 10% finely divided mineral in water, (b) adding to said slurry about 0.01 to about 4.0 pounds of a melamine/formaldehyde polymer per ton of solids, wherein the molecular weight of the polymer is such that a 7% dispersion in hydrochloric acid has a Brookfield viscosity of less than 10 cps, (c) filtering said slurry, and (d) redispersing said slurry with sufficient water and dispersant to a final solids content of at least about 50 percent and a final Brookfield viscosity of less than 1000 cps.

6. Method of claim 5 wherein the melamine/formaldehyde polymer has a molar ratio of melamine to formaldehyde of about 1 to about 3.

7. Method of claim 5 wherein about 0.01 to about 4.0 pounds of a water-soluble copolymer of 2-acrylamido-2-methyl propane sulfonic acid is also added to said slurry per ton of solids therein.

* * * * *